Dec. 31, 1968    B. EDWARDS    3,418,690
APPARATUS FOR MANUFACTURING PLASTIC
CONTAINER WITH THICKENED BEAD
Original Filed May 10, 1961

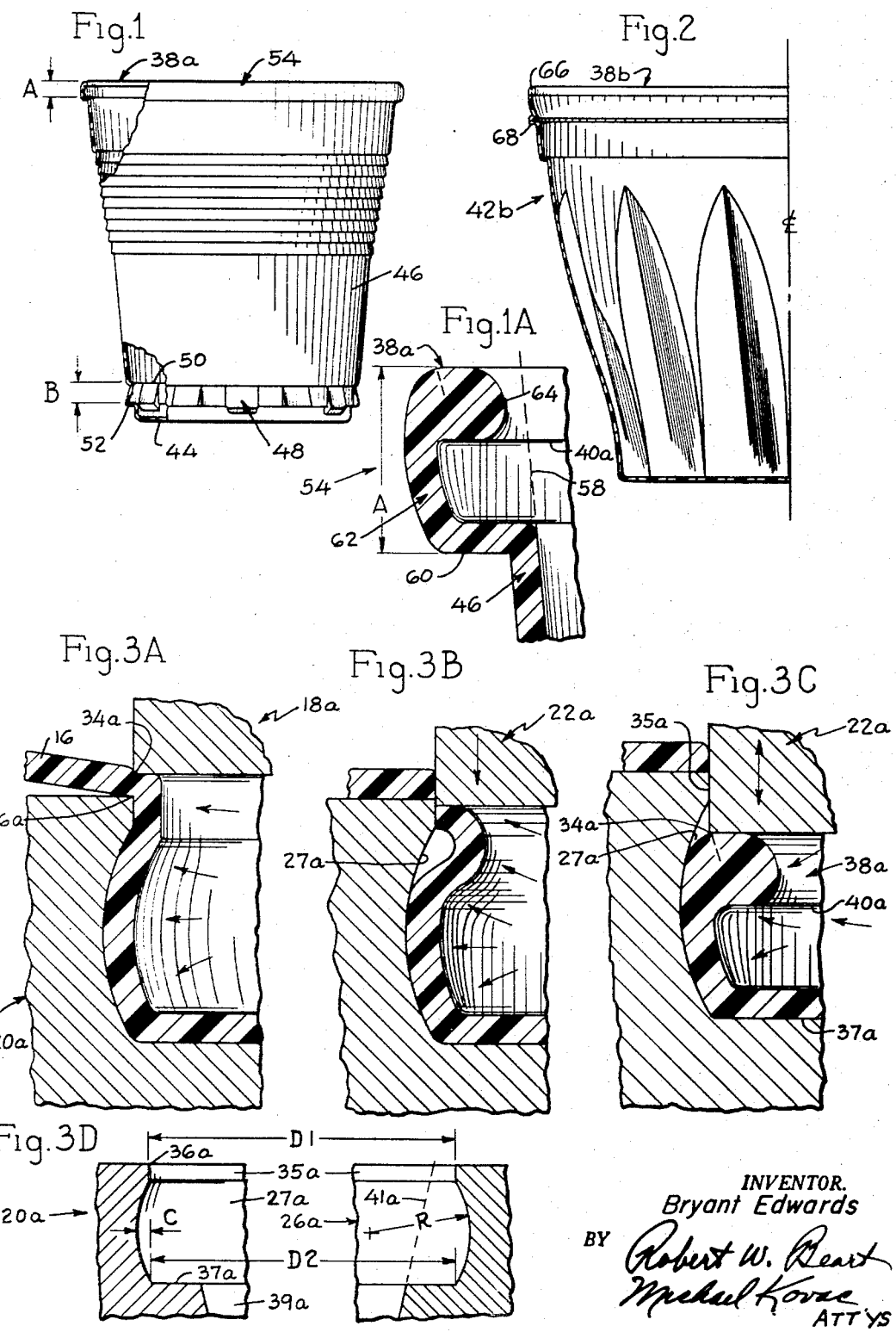

INVENTOR.
Bryant Edwards
BY
ATT'YS

United States Patent Office 3,418,690
Patented Dec. 31, 1968

3,418,690
APPARATUS FOR MANUFACTURING PLASTIC
CONTAINER WITH THICKENED BEAD
Bryant Edwards, Clarendon Hills, Ill., assignor to
Illinois Tool Works Inc., Chicago, Ill., a corporation of Delaware
Original application May 10, 1961, Ser. No. 109,134, now
Patent No. 3,190,530, dated June 22, 1965. Divided and
this application Jan. 4, 1965, Ser. No. 423,163
1 Claim. (Cl. 18—19)

ABSTRACT OF THE DISCLOSURE

Apparatus for forming a smooth beaded undercut rim simultaneously with the molding of an article from a heated web of thermoplastic material utilizing opposed mold members, one of which has a curved portion, to form the article, support a portion of it adjacent its rim against the curved portion of the mold, sever the article from the web and subsequently squash the severed free end thereof while the supported portion is held in place against the curved mold portion by a pressure differential to form the smooth beaded undercut rim.

---

This is a division of application Ser. No. 109,134, filed May 10, 1961, now Patent No. 3,190,530.

There are various well known methods of manufacturing articles from plastic materials. One method is conventionally known as the "Injection Molding Technique." A second well known method is the so-called "Plug Assist-Blow Molding Technique" which manufactures molded articles from a thin web of sheet stock plastic material.

In the manufacture of various containers, lids for containers and other similar articles, it has been a problem using the plug assist molding techniques to get a smooth rim structure or beaded area on the peripheral edge of the molded article. While this may be accomplished by processing of the article subsequent to the molding operation, it has been exceedingly difficult to obtain this desired result in a single molding operation. Injection molding operations of plastic material which may provide an enlarged bead structure on the peripheral edge of the article have suffered the disability of providing a mold parting line located on the rim portion. This parting line is often rough and is particularly undesirable in containers such as cups and the like which should be capable of being used for ordinary drinking purposes without doing damage to the human mouth. Further, injection molding techniques while suitable for many forms of containers, are not suitable for very thin-walled containers which have a wall thickness in the neighborhood of .002 inch to .034 inch. The thinner wall thicknesses of plastic material are advantageously employed to compete with cheaper materials.

The instant invention is directed towards solving the problem of providing a smooth curvilinear bead upon the peripheral edge of a molded article, the bead being provided without a parting line.

It is thus an object of this invention to provide an apparatus which will afford economical manufacture of thin-walled plastic articles with a beaded lip portion in a fast and repetitive manner.

A further object of this invention is to provide apparatus for molding an undercut bead article utilizing first and second opposed mold means which serve the various functions of clamping the material to provide a seal while creating a pressure differential across the web, the providing of a molding surface for the article, and serving as a support means for supporting the molded article while the article is both severed from the web and during the subsequent squashing of the free end of the severed articles, the squashing action also being provided by the mold means.

The novel features which are characteristic of the invention are set forth with particularity in the appended claim. The invention, both as to its organization and its method of operation, together with the additional objects and advantages thereof, will be best understood by studying the following description of specific embodiments in conjunction with the accompanying drawings, in which:

FIG. 1 is a view, partially in section, of one container utilizing the concepts of the invention;

FIG. 1A is an enlarged fractional sectional view of the upper left-hand corner portion of FIG. 1;

FIG. 2 is a sectional view of another article utilizing the concepts of this invention;

FIG. 3A is an enlarged fractional sectional view of various components of the molding apparatus shown in FIG. 11 utilized in the manufacture of the article shown in FIG. 1 and shown in an intermediate position similar to that shown in FIG. 7;

FIG. 3B is a view similar to FIG. 3A showing the intermediate relative position of the components of the apparatus after they have moved slightly from the position shown in FIG. 3A;

FIG. 3C is a view similar to FIGS. 3A and 3B, showing the relative position of the components of the apparatus at a later sequential stage in the molding cycle from that depicted in FIGS. 3A and 3B and similar to the position of apparatus components shown in FIGS. 8 and 11;

FIG. 3D is an enlarged fractional sectional view of the rim molding area of the lower mold means shown in FIG. 11;

Figure 4:
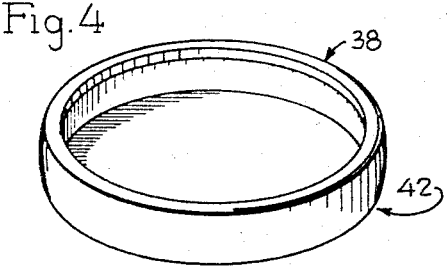
FIG. 4 is a perspective view of the article manufactured on the apparatus shown in FIGS. 5 through 10.

Before discussing the articles of manufacture shown in FIGS. 1, 2 and 4, a discussion of the molding operation shown in FIGS. 5 through 10 would appear to be in order. A web of material 16 which may be of any suitable thermoplastic material, such as for example polystyrene, polyethylene, or the like, is stretched between upper and lower mold means 18 and 20 and is initially spaced therefrom. The overall apparatus for presenting the web of plastic material between the mold means 18 and 20 and the method of actuating same may be for example of the type similar to that disclosed in my co-pending U.S. application entitled "Container and Method and Machinery for Producing Same" filed Sept. 17, 1959 and having Ser. No. 840,604, now Patent No. 3,059,810.

The upper mold means 18 shown comprises a mold or plug member 22 having a generally annular configuration. The outer periphery of mold member 22 has a predetermined diametrical measurement adjacent to the lower edge 34 thereof. It is to be remembered that mold member 22 is a semi-diagrammatic showing and that other portions of the mold member 22 will have various configurations depending upon the article to be molded. Passageway means 24 is provided in the center of mold member 22 to provide an access way for presenting a pressure differential across the web of material. The lower mold means 20 may be provided with passageways for purposes of creating a pressure differential if desired.

The lower mold means 20 has a mold cavity 26 of predetermined configuration as shown. The side walls 27 of the cavity 26 have a sightly concave appearance in vertical section. The radius R defining the side walls 27 taking into consideration the configuration of the surface 27 will be described more particularly in a complete discussion of FIG. 3D which follows herein. A knock-out plug 28 forms a bottom surface of the molding cavity and is movable relative to the lower mold member 26. The upper edge 36 of cavity 26 has adjacent to it a short vertical wall portion of predetermined diameter preferably slightly larger than the diameter of mold portion 34 of member 22.

Figure 5:
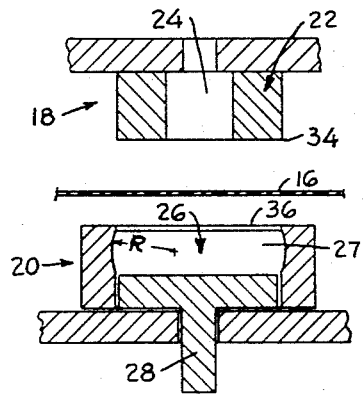
FIG. 5 is a semi-diagrammatic view of the apparatus usable in molding the articles shown in FIG. 4 and illustrating the relative position of the components at the start of the molding cycle.
Figure 6:
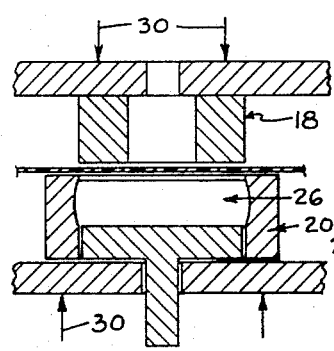
FIG. 6 is a semi-diagrammatic view similar to FIG. 5 showing the relative approaching movement of opposed mold members just prior to engagement with the web of plastic material.
Figure 7:
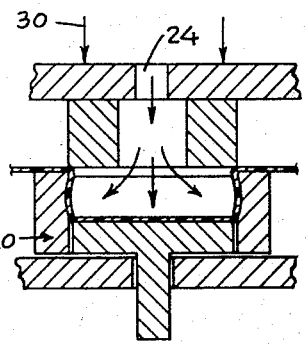
FIG. 7 is a semi-diagrammatic view of the components similar to that shown in FIGS. 5 and 6 showing the movement of the web of material into engagement with the molding surface upon the creation of a pressure differential on opposite sides of the plastic web.
Figure 8:
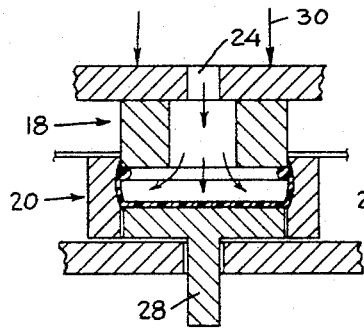
FIG. 8 is a view of the next sequence in the operation of the components shown in FIGS. 5 through 7 showing the relative movement of the mold members to cause a squashing of the end surface of the severed article to provide the undercut bead area while the pressure differential is maintained.

As shown in schematic views of FIGS. 6 through 10, the molding operation may be described as follows: Upper and lower mold means 18 and 20 respectively are moved towards each other with the previously heated plastic web between them from the position shown in FIG. 5 to the intermediate position shown in FIG. 6. The components continue relative movement until they reach the position shown in FIG. 7. There, lip portion 34 of member 22 engages the material 16 by cooperative clamping with the upper edge 36 of the lower mold member 26. At this instant a pressure differential, as depicted in FIG. 7 is applied (as by positive pressure coming through passageway 24) to cause the heated web to move into engagement with the molding cavity 26. The upper mold means 18 and lower mold means 20 are thereafter moved further relative toward one another by suitable means 30 (shown diagrammatically) to cause the clamped portion of the web to be sheared. Continued relative movement of the mold means toward each other (FIG. 8) cause the sheared lip portion of the formed article to be forced downwardly into engagement with other portions of the article wall to cause the still heated plastic material to self-adhere and thereby provide a curvilinear bead. The pressure differential is maintained during this part of the operation.

Figure 9:
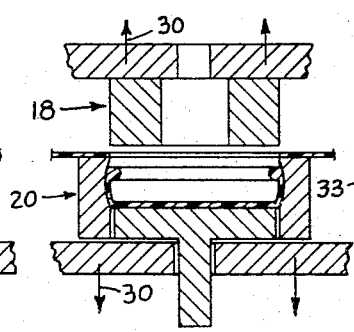
FIG. 9 is the next sequential step in the operation of the semi-diagrammatically shown components of the apparatus of FIGS. 5–8 showing the relative separating movement of the mold members.
Figure 10:
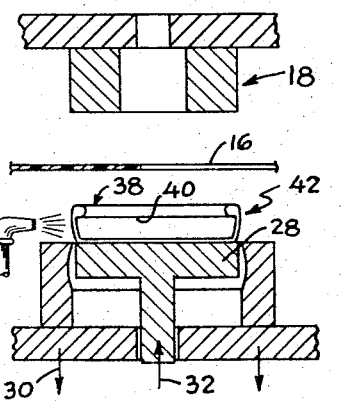
FIG. 10 is a view similar to FIGS. 5–9 showing the ejection of the molded article from the mold while the components are returning towards the position shown in FIG. 5 to start the next cycle.

As shown in FIG. 9 the mold means 18 and 20 are then separated from each other. A knock-out plug 28 is then actuated by suitable means 32 (shown diagrammatically) to move the molded article from the mold and thereafter taken from the vicinity of the mold mouth by suitable means such as an air jet, as shown schematically at 33. Meanwhile, the web of material 16 is indexed to a new position for the next molding cycle and the elements of the mold are returned to their initial position shown in FIG. 5.

An article molded by this technique is shown in FIG. 4 in the form of a shallow bottle or container lid 42. The bead 38 is smooth and is similar to that shown enlarged in section in the FIGS. 1A and 3C. The bead presents an undercut surface 40 which may be engaged by the complementary surface on a lid. The exact formation of bead 38 will be discussed in more detail hereinafter in connection with FIGS. 3A–3D.

Figure 11:
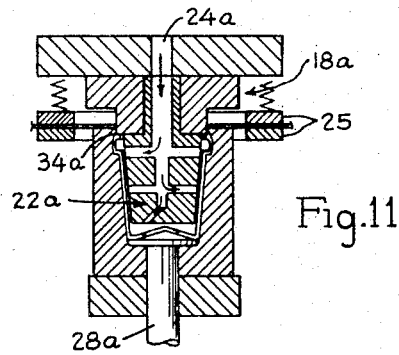
FIG. 11 is a semi-diagrammatic view of the apparatus for manufacture of the article shown in FIG. 1.

In more deep draw molding techniques where mechanical means are necessary to produce a thin-wall container, the upper mold means 18 will have a configuration of the general nature shown in FIG. 11. Similar parts shown in FIG. 11 have similar reference numbers to the previous described embodiment with the addition of the suffix $a$. Auxiliary annular clamp means 25 may be used to permit mechanical draw of the plastic sheet by the leading end of the member 22a prior to the web engaging any portion of the complementary lower mold surface 26a. This allows substantial pre-stretching of the web 16 prior to introduction of the pressure differential across the heated web and prior to the chilling effects which occur as the heated web comes in contact with the molding surface 26a. The sequence of operation of 18a and 20a is similar to that shown in FIGS. 5 through 10. It will be noted that clamping cutoff edge 34a of the upper mold member 22a is spaced radially outwardly from the remainder or nose portion of mold member 22a and inwardly of clamp means 25.

The upper lip portion of the mold means 20a is the same as that shown in FIG. 3D, the remainder of the mold having a complementary configuration to the article shown in FIG. 1. Immediately below the clamping cutoff edge 36a is a small vertical portion 35a, having an axial dimension in the neighborhood of .01 of an inch. The axial height of portion 35a is dependent upon the thickness of the material being sheared and the amount of squashing effect desired upon the bead of the article being formed. As shown in FIGS. 3A–3D, the height of portion 35a is approximately equal to the thickness of the material being molded. Below the vertical portion 35a is a transverse shoulder portion 37a which is here shown generally normal to the axis of the mold. It should be noted that angle of shoulder 37a may be varied within wide limits depending upon the article being molded and the final configuration desired. The furthest radial extent D2 of shoulder 37a is sufficiently great so that an extension of the side walls 39a of mold 26a represented by dotted line 41a will not intersect any portion of surface 35a. Reasons for this relationship are hereafter explained. A curvilinear wall surface 27a joins the lower edge of vertical surface 35a and the radially outward edge of shoulder surface 37a.

The method for determining the radius of curvature R of surface 27a is to construct a curve which will satisfy
(A) connecting the lower edge on surface 35a and the most radially outwardly point on shoulder 37a, and
(B) having a dimension C at its most radially outward point which provides the maximum allowable undercut for proper ejection of the molded part from the mold.

The dimension C is in turn determined by the "contraction" factor, from heated to a cooled state, of the plastic material being molded, times the dimension D1 divided by 2. There is a slight adjustment factor permissible relative to dimension C depending upon the resiliency of the plastic material employed which will allow stripping of slightly oversized parts without permanent distortion of the undercut portion and without damage to the rest of the molded article.

It is desirable to have dimension C (see FIG. 3D) the greatest possible dimension under the circumstances above described. The closer dimension C is to maximum, the easier it becomes to form a smooth bead without uncontrolled buckling of the remaining side wall portions of the article during the formation of the bead 38a. As will be appreciated from viewing FIGS. 3A through 3C, the vertical portion 35a serves as a shearing surface for cutting the material between edges 34a and 36a of the lower and upper mold members respectively. It is important to note that during the cutting or shearing operation and during the formation of the bead 38a, the pressure differential on the opposite sides of the molded web of material is kept at a maximum amount. It is possible to do this either with vacuum pressure (not shown) or through a positive pressure fed through the plug 22a (FIG. 11) as shown. The pressure differential serves to rigidify the side the requirements of
walls of the molded article immediately adjacent to the area 27a during cutting and formation of the bead 38a. Obviously, the pressure differential should be sufficient to retain the container wall upright as forces are applied which would tend to distort the side walls of the article as the cutting and crushing of the end surface of the article is accomplished. Due to the configuration of mold walls 27a the material 16 is curved (reverse S-shaped in section) at the time of cutting. Thus the material is biased or pre-stressed towards buckling as shown in FIG. 3B, but because of the air pressure, the buckling action is directed only adjacent to the upper end of walls 27a. The combination of air pressure, configuration of curvature of mold wall portion 27a, and configuration of vertical surface of the mold 35a controls the buckling of the container side wall (shown in FIG. 3B) during the formation of the bead 38a.

In the operating cycle of the molding apparatus the creation of the pressure differential across the web of material causes almost instantaneous movement of the material from engagement with nose portion 22a to engagement with the mold cavity 26a. Because of this, it is preferred that there be only a slight hesitation in the telescopical relative movement of lip portions 36a and 34a. Lip portions 36a and 34a preferredly move from a nonclamping relationship to a clamping relationship and from a clamping to a shearing relationship (shown in FIGS. 6–8 and 3A to 3D) very quickly so that the plastic material does not have sufficient time to chill upon engagement with the mold cavity. To form some articles having a double undercut, it is possible to stop mold member 22a in the position shown in FIG. 3B. When it is desired to have both an inside and outside undercut adjacent to the top of an article, and where the raw edge caused by the sheared edge is not particularly important, the mere holding of the mold member 22a in the position shown in FIG. 3B will allow the plastic material 16 to freeze in the position shown. This provides a surface which is undercut on the outside of the article as well as providing a slight inside undercut which is not quite as great as undercut 40a shown in FIG. 3C.

It should be noted, at this juncture that the radius R need not extend all the way down to shoulder 37a in FIG. 3D. The most important part of wall portion 27a needing the curved surface is that portion immediately adjacent to shearing surface 35a so as to provide the correct prebuckling aspect. Another modification in the apparatus and molding method is to have the sealing area slightly radially outside of area 36a of the mold and use edge surface 34a for shearing only. This may be done by having other complementary parts on mold members 20a and 18a provide a seal for the pressure differential. This may be advantageous while using exceedingly thin plastic materials. Thus, portions 34a and 36a would still provide the shear surface but there would be no tendency to tear during the sealing and pressure differential molding portions of the total cycle. When the modification (not shown) is used, then corner 34a is preferably spaced slightly from the plastic material and corner 36a and the seal area is radially outside of the seal shown in FIG. 3A.

However, in most instances, and where a smooth bead is desired, mold members 18a and 20a must move quickly between the sealing position and shearing position so that the plastic material does not have sufficient time to chill upon engagement with the mold cavity. The continued relative movement of lip portions 36a and 34a after shearing the web causes downward movement of the sheared edge of plastic (shown in FIGS. 3B and 3C). Because of the quickness of the movement, the sharp sheared edge portions of the plastic are caused to embed themselves in the still heated plastic material immediately adjacent thereto, so as to cause a self-adherence thereof without any parting lines or the like. By accurately controlling the time duration required as well as the desired amount of relative movement of portion 34a relative to portions 36a and 35a, together with control of the air pressure differentials involved, the sheared edge may be kneaded into the plastic side wall material so that the end surface is just flush with the remainder of the bead with no protruding edge. It will be noted that there is just a slight parting of the plastic material from the top of mold side wall 27a immediately adjacent to portion 35a of the mold (caused by the buckling). It is thus preferable in molding plastic materials having a thickness in the neighborhood of .010 of an inch to relatively move the upper mold portion 34a slightly past the junction of side wall portion 27a and vertical portion 35a to assure there will be no parting lines in the finished bead 38a.

An article formed by the apparatus shown in FIG. 11 and FIGS. 3A–3D may have a configuration substantially as shown in FIG. 1. The article 42a may be one of the nestable thin-walled variety having a bottom wall 44 and upwardly outwardly diverging side walls 46. Resilient stacking means 48, as shown in my co-pending application Ser. No. 769,057 filed Oct. 29, 1958, now Patent No. 3,091,360, which is disposed along the side walls 46. The axial dimension B between interfering shoulders 50 and 52 provided by the stacking means 48 is preferably greater than the total axial dimension between top of bead 38a and bottom of shoulder 60 of the rim area 54 defined by dimension A. With this overall configuration, the rim area 54 will not interfere with the resilient stacking of a plurality of nested containers. The side wall portion 46 of article 42a, is preferably formed with a predetermined taper determined by a generatrix rotating around a directrix coincident to the axis of the article. This generatrix is shown diagrammatically by line 58 in FIG. 1A. It will be noted that the shoulder or rim portion 60 interconnects curvilinear wall or rim portion 62 with the side wall 46 and that the furthest radially inwardly point 64 of bead 38a lies radially outwardly of generatrix 58.

The particular configuration of rim area 54 shown in FIG. 1A is also well adapted to retain a lid of the sealing-venting variety disclosed in my co-pending application identified by the Ser. No. 14,669 filed Mar. 14, 1960, now Patent No. 3,061,139. Surface 40a of the bead serves as the retaining undercut portion for pivotal action of the aforediscussed lid and the upper surface of portion 60 serves as the sealing surface. Also, many other types of lids may be associated with this configuration of rim area. It should be recognized that where lids of the type described in my aforementioned application are not desired, the rim portion may be formed as a continuation of the curved portion 62 to flow smoothly into side wall portion 56. In such event care must be taken, if resilient stacking in nested relation of a plurality of containers is desired, that the overall height of the rim area 54 does not exceed dimension A, and that bead portion 64 is radially outward of generatrix 58.

Due to the nature of the fold in the plastic during the forming of the bead 38a, no particles should be trapped at 40a even if a slight misalignment of the sheared edge should occur during production. This is desirable for health consideration, particularly, if the containers are to be of the reusable variety. Even in the throw away variety of containers, undesirable contaminants such as dust and bacteria and the like are then not trappable in the undercut area 40a.

An alternate configuration of article is shown in FIG. 2, and portions similar to aforediscussed articles will be given similar reference numbers with the addition of the suffix b. The form of a food container 42b illustrates a type of container where the bead means 38b can also serve as a part of the stacking function of a plurality of like containers. In this particular embodiment, the uppermost portion of the bead means 38b identified by the reference numeral 66, can cooperate with shoulder 68 spaced therebelow to provide the stacking function in the rim area. Portion 68 may, if desired, have a configuration similar to that shown at 48 in FIG. 1, portion 66 taking the place of interfering shoulder 50 of the embodiment shown in FIG. 1.

Although specific embodiments have been shown and described, it is with full awareness that I state that many modifications thereof are possible. The invention, therefore should not be restricted except as by the appended claim.

What is claimed as the invention is:

1. Apparatus for forming a smooth beaded undercut rim simultaneously with the molding of an article from a heated web of thermoplastic material comprising first and second relatively movable members in axial alignment and disposed on opposite sides of a web of heated thermoplastic material, said first mold means having a molding surface including an axially extending first portion of short length and a curvilinear in vertical cross section second portion immediately adjacent said axially extending portion, the radial extent of the second portion of the first mold means at its junction with the axially extending first portion being less than the greatest radial extent of the second portion by a dimension no greater than the radial extent at said axially extending portion times the contraction rate of said thermoplastic material from a heated to a chilled state, said second mold means having a clamping and serving portion which coacts with the axially extending portion of said first mold means to clamp and sever said web, means for actuating said first and second mold means to bring the coacting clamping portions of the first and second mold means into engagement with said web, means for creating a pressure differential on opposite sides of said web within the clamped area to expand the clamped web portion against the molding surface of the second mold means, said means for actuating said first and second mold means causing subsequent relative movement thereof to first cause severing of the web at the clamped area by the cooperating severing portions of said first and second mold means to provide a molded article having a free end and then squashing of the free end of the molded article to cause self-adherence of the free end with other portions of the article adjacent thereto, the curvilinear in vertical cross section portion of the second mold means imparting a prestressing to the rim of the article being molded to aid in the folding of the material during squashing of the free end, said means for creating a pressure differential being maintained during the severing and squashing of the end of the article to provide a smooth beaded undercut rim on said article.

References Cited

UNITED STATES PATENTS

| | | | |
|---|---|---|---|
| 1,122,393 | 12/1914 | House | 18—19 |
| 2,514,005 | 7/1950 | Middleton et al. | 18—19 |
| 3,011,212 | 12/1961 | Marshall et al. | 264—339 |
| 3,050,773 | 8/1962 | Hagen | 264—296 |
| 3,060,507 | 10/1962 | Knowles | 264—163 |
| 3,065,677 | 11/1962 | Loeser | 264—296 |

ROBERT F. WHITE, *Primary Examiner.*

S. I. LANDSMAN, *Assistant Examiner.*

U.S. Cl. X.R.

264—92, 93, 153, 163, 296